(12) United States Patent
Plutt et al.

(10) Patent No.: US 7,021,883 B1
(45) Date of Patent: Apr. 4, 2006

(54) SYSTEM AND METHOD FOR TRANSPORTING MEDIA CARTRIDGES

(75) Inventors: Dan Plutt, Superior, CO (US); Don B. Wait, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 29 days.

(21) Appl. No.: 10/394,074

(22) Filed: Mar. 18, 2003

(51) Int. Cl.
*B65G 1/00* (2006.01)

(52) U.S. Cl. ..................... 414/277; 700/214
(58) Field of Classification Search ............... 414/277, 414/280, 281, 807; 360/92; 369/34, 36, 369/192; 700/214

See application file for complete search history.

(56) References Cited

U.S. PATENT DOCUMENTS

| | | | |
|---|---|---|---|
| 4,864,438 A | 9/1989 | Munro | |
| 5,277,534 A | 1/1994 | Anderson et al. | |
| 5,289,589 A | 2/1994 | Bingham et al. | |
| 5,570,337 A | 10/1996 | Dang | |
| 5,850,569 A | 12/1998 | Luif et al. | |
| 5,892,750 A | 4/1999 | Barkley et al. | |
| 6,059,509 A | 5/2000 | Ostwald | |
| 6,085,123 A | 7/2000 | Baca et al. | |
| 6,286,078 B1 | 9/2001 | Fuld | |
| 6,314,338 B1 | 11/2001 | Billington | |
| 6,494,663 B1* | 12/2002 | Ostwald et al. ............. | 414/281 |
| 6,636,779 B1* | 10/2003 | Borrego et al. ............. | 700/214 |
| 6,736,583 B1* | 5/2004 | Ostwald et al. ............. | 360/92 |

FOREIGN PATENT DOCUMENTS

WO     WO 01/06506 A1    1/2001

OTHER PUBLICATIONS

SPI publication, Title: "Cartridge Handling Systems. Oct. 1973", "Software Patent Institute Database of Software Technologies" Record Display Record 1 (Revised Nov. 2001 by wem, bill@spi.org).

SPI publication, Title: "Multipath Controls", "Software Patent Institute Database of Software Technologies" Record Display Record 2 (revised Nov. 2001 by wem, bill@spi.org).

SPI publication, Title: "Tracing Volume in a Mass Storage System. Sep. 1980", "Software Patent Institute Database of Software Technologies", Record Display Record 2 (revised Nov. 2001 by wem, bill@spi.org).

* cited by examiner

*Primary Examiner*—James R. Bidwell
(74) *Attorney, Agent, or Firm*—Brooks Kushman P.C.

(57) ABSTRACT

An invention for use with transporting media cartridges between a first storage library and a second storage library. The invention comprises at least two pass through ports connecting the first and second storage libraries for use in transporting media cartridges between the first and second storage libraries. The at least two pass through ports provide redundant operation of the multiple data storage library system to ensure media cartridge transportability between the first and second storage libraries in the event that one of the at least two pass through ports should become inactive.

24 Claims, 1 Drawing Sheet

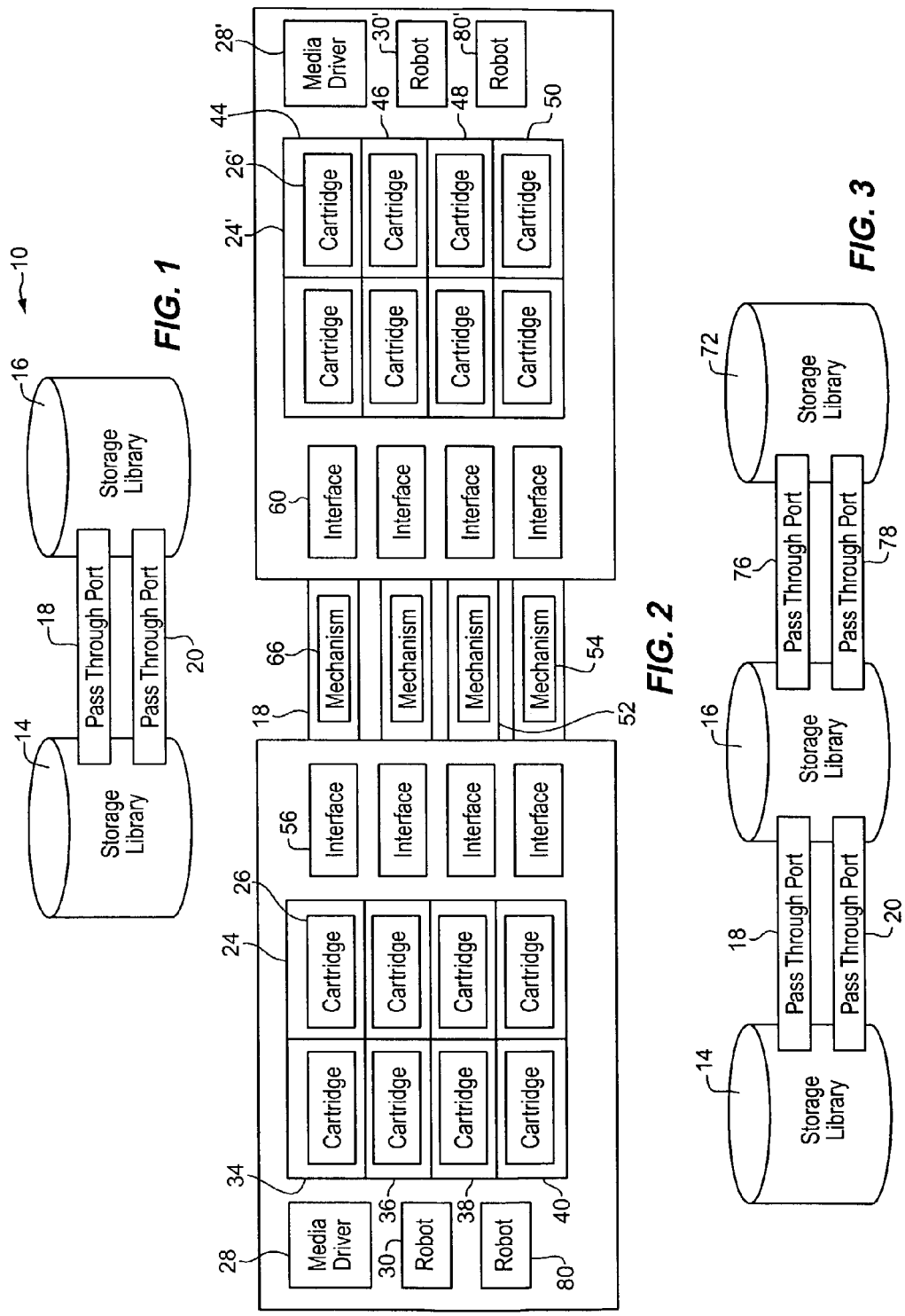

SYSTEM AND METHOD FOR TRANSPORTING MEDIA CARTRIDGES

BACKGROUND OF THE INVENTION

1. Field of the Invention

The present invention relates to the transportation of media cartridges from one storage library to another storage library.

2. Background Art

A data storage library includes a number of storage cells for storing media cartridges. Data is read from and written to the media cartridges. Computers and other devices can use the data stored on the media cartridges.

A multiple storage library system relies on cooperative operation between multiple storage libraries. The cooperative operation depends upon transportation of media cartridges between multiple storage libraries. For example, a media cartridge may need to be transported from a first storage library to a second storage library within the same system.

As the storage libraries are individual entities, a separate connecting means is required to connect the separate entities to transport a media cartridge from the first storage library to the second storage library. A pass through port can be used to transport the media cartridge from the first storage library to the second storage library. If the pass through port should fail or otherwise become inactive, the cooperative operation of the multiple storage library system also fails or becomes similarly inactive.

SUMMARY OF THE INVENTION

The present invention provides at least two pass through ports for transporting media cartridges between at least two storage libraries comprising a multiple storage library system to ensure redundancy of the system and activity of the system if one of the at least two pass through ports should fail or otherwise become inactive.

One aspect of the present invention relates to a system for use in transporting media cartridges. The system comprises a first storage library for storing a plurality of media cartridges and a second storage library for storing a plurality of media cartridges. The system further comprises at least two pass through ports connecting the first and second storage libraries for use in transporting media cartridges between the libraries. Each pass through port is configured for transportation of media cartridges to and from the first and second storage libraries. The pass through ports are independently operable to provide redundancy such that one of the at least two pass through ports permits media cartridge transportation between the first and second storage libraries when another of the at least two pass through ports is inactive.

Another aspect of the present invention relates to a storage library system having at least three storage libraries relying on exchange of media cartridges between each library. The system comprises a first storage library for storing a plurality of media cartridges, a second storage library for storing a plurality of media cartridges, and at least a third storage library for storing a plurality of media cartridges. The system further comprises at least two pass through ports connecting the first and second storage libraries for use in transporting media cartridges between the first and second storage libraries. Each pass through port is configured for transportation of media cartridges to and from the first and second storage libraries. The ports are independently operable to provide redundancy such that one of the at least two pass through ports permits media cartridge transportation between the first and second storage libraries when another of the at least two ports is inactive. The system still further comprises at least two pass through ports connecting the second and third storage libraries for use in transporting media cartridges between the libraries. Each pass through port is configured for transportation of media cartridges to and from the second and third libraries. The ports are independently operable to provide redundancy such that one of the at least two pass through ports permits media cartridge transportation between the second and third storage libraries when another of the at least two ports is inactive.

Still another aspect of the present invention relates to a method for transporting media cartridges between a first storage library and a second storage library. The method comprises configuring at least two pass through ports to connect the first and second storage libraries for use in transporting media cartridges between the libraries. Each pass through port is configured for transportation of media cartridges to and from the first and second storage libraries. The pass through ports are configured to be independently operable to provide redundancy such that one of the at least two pass through ports permits media cartridge transportation between the first and second storage libraries when another of the at least two pass through ports is inactive.

BRIEF DESCRIPTION OF THE DRAWINGS

FIG. 1 illustrates a multiple data storage library system in accordance with the present invention;

FIG. 2 illustrates one configuration for storage libraries operable with the data storage library system in accordance with the present invention; and FIG. 3 illustrates another multiple data storage library system in accordance with the present invention.

DETAILED DESCRIPTION OF THE PREFERRED EMBODIMENTS

FIG. 1 illustrates a multiple data storage library system 10 in accordance with the present invention. The system includes at least a first storage library 14 and a second storage library 16. The storage library system 10 relies on cooperative operation between the multiple storage libraries 14, 16. The cooperative operation depends upon transportation of media cartridges between the libraries 14, 16.

As the storage libraries 14, 16 are individual entities, a separate connecting means is required to connect the separate entities to transport a media cartridge from the first storage library 14 to the second storage library 16, such as a pass through port 18. If the pass through port 18 should fail or otherwise become inactive, the cooperative operation of the multiple storage library system 10 also fails or becomes similarly inactive.

To ensure continued operation of the multiple storage library system 10, one aspect of the present invention provides a second redundant pass through port 20. With the addition of the second pass through port 20, the system 10 includes at least two pass through ports 18, 20. As such, should one of the pass through ports fail, the other pass through port provides redundancy and is available to continue operation of the system 10.

Such tape transportability permits the system 10 to leverage off each storage library 14, 16. Cartridges can be transported from library to the other library to increase storage space, to conduct cleaning and repairs, or to perform other tasks.

FIG. 2 illustrates one configuration for storage libraries operable with the data storage library system 10 in accordance with the present invention. The storage libraries 14, 16 are generally shown in block diagram form and include a number of storage cells 24, 24', a number of media cartridges 26, 26', at least one media driver 28, 28', and at least one robot 30, 30' respectively. These particular features are not intended to limit the scope and content of the present invention, rather any combination of more or less of these or other components is contemplated.

The storage libraries 14, 16 comprise an array arrangement for storage cells 24, 24'. The first storage library 14 array comprises a first row 34, a second row 36, a third row 38, and a fourth row 40 of storage cells 24. The second storage library 16 comprises a similar array arrangement comprising a first row 44, a second row 46, a third row 48, and a fourth row 50 of storage cells 24'. This arrangement of storage cells 24, 24' can include any other arrangement and is not intended to limit the scope of the present invention.

The first pass through port 18 connects the first row 34 in the first storage library 14 with the first row 44 in the second storage library 16. The second pass through port 20 connects the second row 36 in the first storage library 14 with the second row 46 in the second storage library 16. A third pass through port 52 connects the third row 38 in the first storage library 14 with the third row 48 in the second storage library 16. A fourth pass through port 54 connects the fourth row 40 in the first library 14 with the fourth row 50 in the second storage library 16. Pass through ports in each of the rows connect with a corresponding row in the adjacent storage library, but any number of pass through ports can be used and need not correspond with corresponding rows in the adjoining library.

Optionally, a first alignment interface 56 in the first library 14 corresponds with a first side of the first pass through port 28 and a second alignment interface 60 in the second library 16 corresponds with a second side of the first pass through port 28. The interfaces 56, 60 help position the pass through port 18 within each library 14, 16. This is especially helpful with after market and after construction addition of the pass through ports.

The alignment interfaces 56, 60 simulate a storage cell 18, such that the robot 24, 24' in each library 14, 16 can remove and replace media cartridges as if the alignment interfaces 56, 60 were one of the storage cells 18. In this manner, the alignment interfaces 56, 60 simulate a storage cell 18 and define openings into each storage libraries 14, 16. The robots 24, 24' can remove and replace media cartridges 20 to and from the alignment interfaces 56, 60 without ever knowing whether the media cartridges 20 in the alignment interfaces 56, 60 are transported to another storage library or received from another storage library. Each pass through port can include interfaces.

Each pass through port 18, 20, 52, and 54 includes a pass through port mechanism 66. The pass through port mechanism 66 can include any mechanism to facilitate movement of the media cartridges 20 through the pass through port. The pass through port mechanism 66, for example, can be a slide having a gradient, a robot, a rotary bucket, a pass through track, a combination of these mechanisms, or any other stationary or movable means.

The four pass through ports 28, 30, 52 and 54 connecting the first storage library 14 with second storage library 16 are separate structures having separate housings enclosing each pass through port. The pass through ports can also be enclosed within a common housing. As such, a pass through port generally refers to a connection occurring between corresponding alignment interface openings of two storage libraries through which a media cartridge is transportable with each connection being enclosed by separate housings or with all the connections being enclosed in one housing.

FIG. 3 illustrates another multiple storage library system 70 in accordance with the present invention. This multiple storage library system includes the first storage library 14, the second storage library 16, as described above, and in addition to a third storage library 72. This system 70 linearly aligns the storage libraries such that the electrical power compartment commonly located at a rear of the storage libraries are aligned linearly for easy access. The linear arrangement requires linear transportation of the media cartridges.

Linear transportation of the media cartridges requires each media cartridge to travel through the second storage library 16. A media cartridge must move from the first storage library 14 to the second storage library 16 to the third storage library 72 to travel from the first storage library 14 to the third storage library 72. The inability of the media cartridge to travel in such a manner negatively affects operation of such systems.

The present invention provides redundant pass through ports between the second storage library 16 and each of the first storage library 14 and the third storage library 72. As such, at least two pass through ports 18, 20 connect between the first storage library 14 and the second storage library 16 and two more pass through ports 76, 78 connect between the second storage library 16 and the third storage library 72. Without such redundancy, the failure of one of the pass through ports could prevent the first storage library 14 and the third storage library 72 form transporting media cartridges to each other and negatively affect operation of the system.

The first storage library 14 and second storage library 16 can each include a second robot 80, 80' to operate in conjunction with the at least two pass through ports 18, 20 to further enhance redundancy. For example, with respect to the first library 14, while the first robot 30 is positioning a first media cartridge 26 relative to one of the storage cells 24, or the optional media driver 28, the second robot 80 can remove and replace a second media cartridges 26 from one of the pass through ports 18, 20. The first robot 30 deposits the first cartridge 26 and returns to one of the pass through ports 18, 20 to pick up another. In the mean time, the second robot 80 has retrieved the second media cartridge 26 and repeats the process just performed by the first robot 30 of positioning the media cartridge relative to one of the storage cells 24 or the optional media driver 28. The simultaneous operation of the multiple robots 30, 80 provides additional redundancy and increased operation speed. If one of the robots should fail, the remaining robot keeps operating. Consequently, before the system 10 can become inactive, either both pass through ports 18, 20 must become inactive or both robots 70, 80 must become inactive. Alternatively, one of the robots 30, 80 can remain inactive until the other robot fails.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for use in transporting media cartridges, the system comprising:
    a first storage library for storing a plurality of media cartridges;
    a second storage library for storing a plurality of media cartridges; and
    at least two pass through ports connecting the first and second storage libraries for use in transporting media cartridges between the libraries, wherein each port is configured for transportation of media cartridges to and from the first and second libraries, and wherein the ports are independent to provide redundancy such that one of the at least two ports permits any media cartridge to be transported between the first and second libraries when another of the at least two ports is inactive.

2. The system of claim 1 further comprising a pass through mechanism within each pass through port for transporting a media cartridge through the port.

3. The system of claim 1 further comprises at least two robots in each storage library for operating in conjunction with the at least two pass through ports, wherein the at least two robots in each library provide additional redundancy.

4. The system of claim 3 wherein at least one of the robots remains inactive and becomes active only after at least one other robot in the same library becomes inactive.

5. The system of claim 1 wherein the at least two pass through ports are separate structures.

6. The system of the claim 1 wherein each of the first and second storage libraries comprise an array of cells for holding the media cartridges, the array comprising a first row of cells and a second row of cells, wherein one of the at least two pass through ports connects the first row of cells in the first library and the first row of cells in the second library, and another of the at least two pass through ports connects the second row of cells in the first library and the second row of cells in the second library.

7. The system of claim 1 further comprising a third storage library and at least two pass through ports connecting the second library and the third library for use in transporting media cartridges between the second and third libraries.

8. The system of claim 7 wherein the first, second and third storage libraries are configured for transportation of a media cartridge in the first storage library to the third storage library only by transporting the media cartridge through one of the at least two pass through ports connecting the first and second libraries and then transporting the media cartridge through one of the at least two pass through ports connecting the second and third libraries.

9. The system of claim 1 wherein each pass through port comprises a first alignment interface for connecting a first side of the port to the first storage library and a second alignment interface for connecting a second side of the port to the second storage library.

10. A storage library system having at least three storage libraries relying on exchange of media cartridges between each library, the system comprising:
    a first storage library for storing a plurality of media cartridges;
    a second storage library for storing a plurality of media cartridges;
    at least a third storage library for storing a plurality of media cartridges;
    at least two pass through ports connecting the first and second storage libraries for use in transporting media cartridges between the libraries, wherein each port is configured for transportation of media cartridges to and from the first and second libraries, and wherein the ports are independent to provide redundancy such that one of the at least two ports permits media cartridge transportation between the first and second libraries when another of the at least two ports is inactive; and
    at least two pass through ports connecting the second and third storage libraries for use in transporting media cartridges between the libraries, wherein each port is configured for transportation of media cartridges to and from the second and third libraries, and wherein the ports are independent to provide redundancy such that one of the at least two ports permits media cartridge transportation between the second and third libraries when another of the at least two ports is inactive.

11. The system of claim 10 wherein each of the first, second, and third storage libraries further comprises at least two robots in each storage library for operating in conjunction with the at least two pass through ports, wherein the at least two robots in each library provide additional redundancy.

12. A method for transporting media cartridges between a first storage library and a second storage library, the method comprising:
    configuring at least two pass through ports to connect the first and second libraries for use in transporting media cartridges between the libraries, wherein each port is configured for transportation of media cartridges to and from the first and second libraries, and wherein the ports are independent to provide redundancy such that one of the at least two ports permits any media cartridge to be transported between the first and second libraries when another of the at least two ports is inactive.

13. The method of claim 12 further comprising providing a pass through mechanism within each pass through port for transporting a media cartridge through the port.

14. The method of claim 12 further comprising providing at least two robots in each storage library for operating in conjunction with the at least two pass through ports, wherein the at least two robots in each library provide additional redundancy and increased operation speed.

15. The method of claim 12 further comprising configuring at least one of the robots to remain inactive and become active only after at least one other robot in the same library becomes inactive.

16. The method of claim 12 further comprising configuring the pass through ports as separate structures.

17. The method of the claim 12 further comprising providing each of the first and second storage libraries with an array of cells for holding the media cartridges, the array comprising a first row of cells and a second row of cells, wherein one of the at least two pass through ports connects the first row of cells in the first library and the first row of cells in the second library, and another of the at least two pass through ports connects the second row of cells in the first library and the second row of cells in the second library.

18. The method of claim 12 further comprising providing a third storage library and configuring at least two pass through ports to connect the second library and the third library for use in transporting media cartridges between the second and third libraries.

19. The method of claim 18 further comprising configuring the first, second and third storage libraries for transportation of a media cartridge in the first storage library to the third storage library only by transporting the media cartridge through one of the at least two pass through ports connecting the first and second libraries and then transporting the media cartridge through one of the at least two pass through ports connecting the second and third libraries.

20. The method of claim 12 further comprising providing each pass through port comprises a first alignment interface for connecting a first side of the port to the first storage library and a second alignment interface for connecting a second side of the port to the second storage library.

21. The system of claim 9 wherein the alignment interfaces mimic storage cells used to hold the media cartridges.

22. The system of claim 21 wherein each library includes a robot for transporting media cartridges throughout the corresponding library, and wherein the interfaces prevent the robots from passing therethrough such that pass through mechanisms are included within each pass through port for transporting media cartridges through the port.

23. A system for use in transporting media cartridges, the system comprising:
   a first storage library for storing a plurality of media cartridges;
   a second storage library for storing a plurality of media cartridges; and
   at least two pass through ports connecting the first and second storage libraries for use in transporting media cartridges between the libraries, wherein each port is configured for transportation of media cartridges to and from the first and second libraries, and wherein the ports are independent to provide redundancy such that one of the at least two ports permits media cartridge transportation between the first and second libraries when another of the at least two ports is inactive;
   wherein each pass through port includes a first alignment interface for connecting a first side of the port to the first storage library and a second alignment interface for connecting a second side of the port to the second storage library, wherein the alignment interfaces mimic storage cells used to hold the media cartridges.

24. The system of claim 23 wherein each library includes a robot for transporting media cartridges throughout the corresponding library, and wherein the interfaces prevent the robots from passing therethrough such that pass through mechanisms are included within each pass through port for transporting media cartridges through the port.

\* \* \* \* \*